United States Patent [19]

Muggli

[11] Patent Number: 5,456,955
[45] Date of Patent: Oct. 10, 1995

[54] METHOD AND APPARATUS FOR FORMING AN ILLUMINATED DISPLAY

[75] Inventor: Dale Muggli, Bothell, Wash.

[73] Assignee: Illuminated Display Division of Bell Industries, Inc., Redmond, Wash.

[21] Appl. No.: 989,092

[22] Filed: Dec. 11, 1992

[51] Int. Cl.⁶ .............................. B05D 3/06; B23K 26/00
[52] U.S. Cl. ........................................ 427/555; 219/121.69
[58] Field of Search ....................... 427/555; 219/121.85, 219/121.69; 156/643

[56] References Cited

U.S. PATENT DOCUMENTS

| | | | |
|---|---|---|---|
| 4,117,177 | 9/1978 | Schlafer | 427/555 |
| 4,245,003 | 1/1981 | Oransky et al. | 427/555 |
| 4,514,456 | 4/1985 | Deal et al. | 427/555 |
| 4,515,867 | 5/1985 | Bleacher et al. | 427/555 |
| 4,588,674 | 5/1986 | Stewart et al. | 430/273 |
| 4,791,267 | 12/1988 | Yokoyama et al. | 219/121.69 |
| 4,959,275 | 9/1990 | Iguchi et al. | 428/603 |
| 4,968,526 | 11/1990 | Takii et al. | 427/264 |
| 4,985,116 | 1/1991 | Mettler et al. | 156/656 |
| 5,169,678 | 12/1992 | Cole et al. | 427/555 |
| 5,182,188 | 1/1993 | Cole, Jr. et al. | 427/555 |

*Primary Examiner*—Marianne Padgett
*Attorney, Agent, or Firm*—Poms, Smith, Lande & Rose

[57] ABSTRACT

This invention concerns a novel structure for an illuminated display and unique method for forming illuminated displays. This structure of the display includes a substrate on which are deposited one or more light transmissive layers and an over coating of a light absorptive material. A clear separation layer is also disposed between the light transmissive layers and the light absorptive layers. The novel fabrication process of the present invention includes the use of a NdYAG laser to etch indicia in the light absorptive layer. The NdYAG laser may be operated in either a continuous or pulsed mode at power levels below approximately eight watts and at a rate of travel of about six inches per second. In one preferred embodiment indicia etching is performed operating the NdYAG laser in a pulsed mode and the pattern of indicia is retraced operating the laser in a lower power continuous mode to remove potential residue from etched regions of the light absorptive layer.

28 Claims, 1 Drawing Sheet

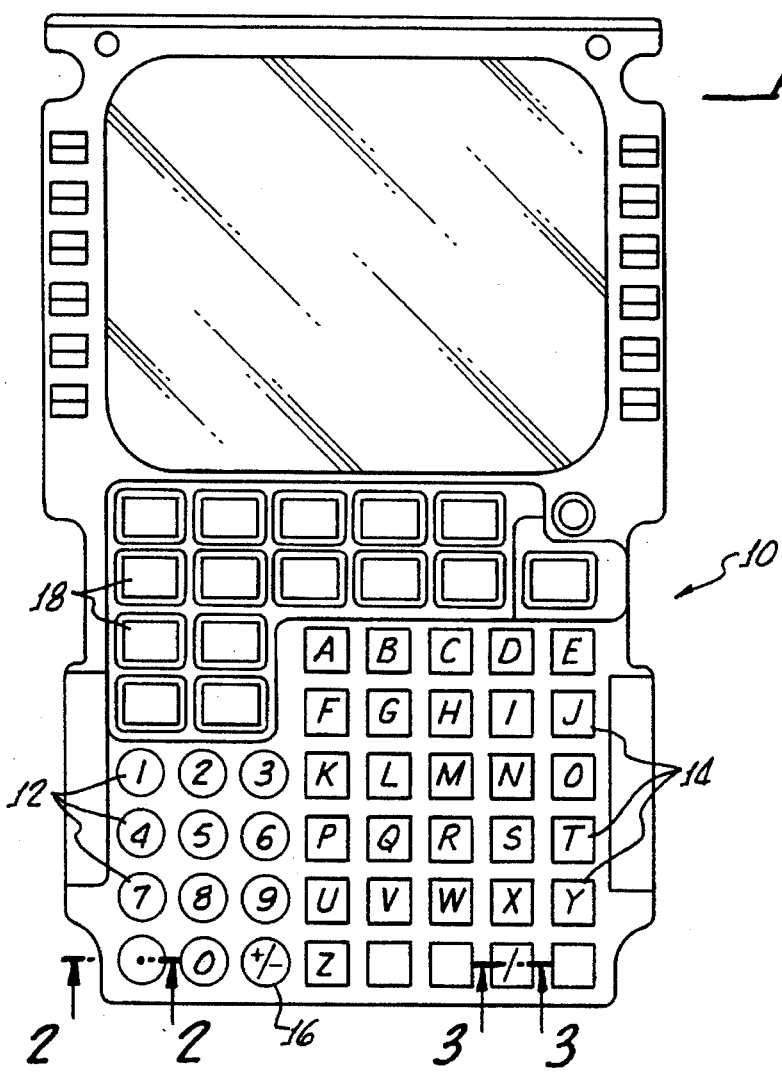
FIG. 1.
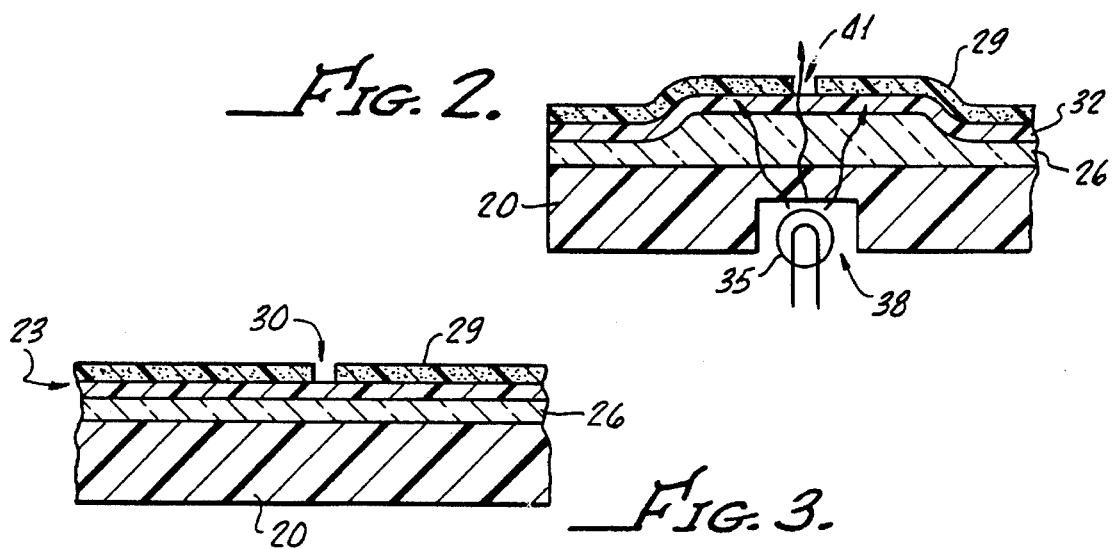
FIG. 2.
FIG. 3.

METHOD AND APPARATUS FOR FORMING AN ILLUMINATED DISPLAY

FIELD OF THE INVENTION

The present invention is generally directed to illuminated type displays and, more particularly, an improved method of fabricating a unique form of illuminated display.

BACKGROUND OF THE INVENTION

Illuminated displays are a widely employed device for presenting visual information to a user where low ambient light conditions are anticipated. One highly useful form of illuminated display employs a lighting technique known as backlighting to illuminate the display. Backlit type illuminated displays are commonly used in automobile dashboards and the instrument panels of aircraft. Generally backlit type illuminated displays present visual information to a user in the form of light colored indicia presented on a dark background and is typically equipped with light sources disposed behind the display panel. In low ambient light conditions, illumination from these light sources projects through the light colored indicia to provide self illumination to the display.

Backlit type illuminated displays are typically made by applying one or more layers of light translucent material on a display substrate and then covering these translucent layers with a final coating of light absorbent material. The final coating is then etched in some appropriate manner to expose the underlying translucent layer or layers in a preselected pattern defining the desired indicia. One method of etching the light absorptive material in a preselected pattern involves the use of a coherent laser beam to physically remove material from the light absorptive over coating. Typically, $CO_2$ or NdYAG lasers are employed, as illustrated, for example, in U.S. Pat. No. 4,968,526, to Takii, et al.

While laser etching may be performed fairly rapidly, this approach regrettably suffers from some disadvantages. For example, uneconomically precise tolerances must be maintained in the thickness of the translucent layers and final coating applied to the display substrate in order to achieve satisfactorily even illumination through the laser etched indicia. Unfortunately, the depth of etching performed by the laser is normally determined predominantly by the energy density of the laser beam. Consequently, beam focusing techniques are the primary method of controlling the depth of etching achieved with the laser beam. While the precise location of the focused beam with respect to the output end of the laser can typically be easily controlled, usually the same cannot be said for the position and thickness of the various layers making up the display. It is typically very difficult to control paint thickness tolerances sufficiently closely to ensure that the laser beam will etch entirely through the light absorptive coating without also inadvertently removing too much or too little of the underlying light transmissive layer or layers. Usually, the power setting and focus of the laser beam are adjusted if variations in layer thicknesses are known. In some applications, one or more of the underlying translucent layers forming the illuminated display may be configured with varying thicknesses so as to transmit light from discrete light sources behind the display so as to achieve uniform illumination throughout the display. In such applications, laser etching techniques cannot be readily employed to etch indicia onto the display without employing expensive and disadvantageously complex control of the laser etching process.

Thus, there still exists a need for an illuminated type display and display fabrication techniques that allow for the use of laser etching without requiring excessive control or uniformity concerning the thicknesses of the various layers forming the illuminated display. The present invention fulfills this need.

SUMMARY OF THE INVENTION

Broadly, and in general terms, the present invention provides a novel method for forming a unique illuminated display that can be readily performed using laser etching with a NdYAG laser without imposing undesirably precise tolerances on the thicknesses of the various light transmissive and light absorptive layers forming the display. In one preferred embodiment, the present invention includes an illuminated display having a clear layer separating one or more light transmissive layers from a light absorptive over coating on a display substrate. The novel illuminated display forming method of the present invention further includes the use of a NdYAG laser beam at 1064 nanometers to remove portions of the light absorptive over coating in a preselected patterns that form the desired indicia on the display panel. It has been found that use of an NdYAG laser beam in conjunction with a clear coat layer separating the light absorptive and light transmissive layers permits complete removal of the light absorptive over coating in a preselected pattern without damage to the underlying light transmissive layers, despite wide variations in the thicknesses of the various layers.

In one preferred embodiment, etching of the light absorptive layer in a preselected pattern indicia forming is performed using the NdYAG laser in a pulsed mode at approximately 30 kilohertz with a power level of approximately 7 watts and a travel rate of about 6 inches per second. Additionally, the NdYAG laser may be used to retrace the preselected etch pattern so as to eliminate potential discoloration in regions etched during operation of the NdYAG laser in the pulsed mode. During this retracing step, the NdYAG laser is preferably operated in a continuous mode at a power level of 3 to 4 watts and the same rate of travel. In an alternative embodiment of the present invention, the initial etching of the light absorptive layer is performed using the NdYAG laser in a continuous mode. In this embodiment, the laser is operated at power levels between approximately 2.5 and 7.5 watts, with a travel rate of 6 inches per second.

The novel features of the present invention will be better understood from the following detailed description, considered in connection with the accompanying drawings, wherein like numbers designate like elements. It should be expressly understood, however, that the drawings are for purposes of illustration and description only and are not intended as a definition of the limits of the present invention.

DESCRIPTION OF THE DRAWINGS

FIG. 1 is a front view of an exemplary illuminated display made in accordance with the present invention.

FIG. 2 is a sectional side view of the various light absorptive, clear and light transmissive layers forming a portion of the illuminated display illustrated in FIG. 1, along the lines 2—2 shown in FIG. 1.

FIG. 3 is an additional sectional side view of a portion of the various layers forming the illuminated display illustrated in FIG. 1, along the lines 3—3 shown in FIG. 1.

DETAILED DESCRIPTION

Referring to the figures, and more particularly FIG. 1, there is shown an illustrative example of one form of a backlit type illuminated display 10 made in accordance with the present invention. As shown, the illuminated display 10 includes various indicia such as numbers 12 and letters 14 visible to a user of the display 10. Of course, other symbolic indicia may be included such as the "±" symbol shown at 16. Other function specific keys such as keys 18 may also contain additional specific indicia (not shown). The indicia 12, 14 and 16 are typically visible to a user in normal daylight without self illumination of the display 10. In low ambient light conditions, however, light sources within or behind the display 10 are activated so that the indicia 12, 14 and 16 are self illuminated. The illuminated display 10 shown in FIG. 1 is an example of a backlit type of illuminated display. It should, of course, be understood that other types of illuminated displays can be made in accordance with the present invention without departing from the spirit of this invention.

FIG. 3 provides a partial sectional side view of a portion of the exemplary illuminated display 10 along the line 3—3 shown in FIG. 1. As shown in FIG. 3, the illuminated display 10 includes a substrate 20 on which several layers 23 are deposited. These layers include a first light transmissive layer 26 deposited directly onto the substrate 20 and a light absorptive layer 29. As shown, the light absorptive layer 29 includes an etched region 30 forming a portion of a user identifiable indicia such as the numbers 12 and letters 14 shown in FIG. 1. The light transmissive layer 29 is selected to convey light energy from a source disposed distant from the etched portion 30 of the light absorptive layer 29 so that, in low ambient light conditions, the indicia are self illuminated by light transmitted through the light transmissive layer 26 and escaping through the etched region 30. Typically, the colors of the light transmissive layer 26 and light absorptive layer 29 are selected to provide sufficient contrast for identification of the indicia without use of a light source in bright ambient light conditions. For example, the light absorptive layer 29 may be black in color while the light transmissive layer 26 may be white.

In accordance with the present invention, a clear layer 32 is disposed between the light transmissive layer 26 and the light absorptive layer 29. It has been found that addition of this clear separation layer 32 between the light transmissive layer 26 and the light absorptive layer 29 permits etching of the indicia through the light absorptive layer 29 with an NdYAG laser beam so as to form etch regions such as region 30 despite wide variations in the thicknesses of the light transmissive layer 26 and the light absorptive layer 29. Variations in the thickness of the light transmissive layer 26 may be desired in proximity to a light source to conduct a greater amount of light through the light transmissive layer 26 to etched indicia in the light absorptive layer 29 distant from the light source, such as the etched region 30 in the light absorptive layer 29 illustrated in FIG. 3. Thus, for example, as shown in FIG. 2 the light transmissive layer 26 is preferably somewhat thicker in a region proximate a light source 35 disposed in recessed region 38 of the display substrate 20. As further shown in FIG. 2, another etched region 41 may also be formed in the light absorptive layer 29 to form further indicia near the light source 35.

In accordance with the present invention the light transmissive, clear and light absorptive layers are preferably paints that are typically applied to the display substrate 20 by spray type application. The light transmissive layer 26 is preferably white in color to enhance light propagation from a light source disposed behind the display, such as for example light source 35 in FIG. 2, to indicia spaced distant from the light source, such as the etched region 30 in the light absorptive layer 29 illustrate in FIG. 3. It has been determined that the light transmissive layer 26 is preferably made from a non-epoxy based paint. Less satisfactory results are achieved with use of a NdYAG laser beam to form indicia through the light absorptive layer if an epoxy based paint is used to form the light transmissive layer 26. The light absorptive layer 29 is preferably, though not necessarily, a black color paint and may be of any desired composition, such as, for example, polyurethane based paints and nitrocelyuous lacquers. Of course, if desired, additional colored layers of paint may be applied over the light absorptive layer 29 to provide a display panel of any desired color. Additionally, the clear separation layers is preferably though not necessarily, made of a flatted clear rather than a high gloss clear paint.

As discussed above the present invention is considered to include both the unique illuminated display structure discussed above as well as a novel method of fabricating this illuminated display. This method includes the use of a NdYAG laser operating in either a continuous or pulsed mode to etch portions of the light absorptive layer, and any colored overcoating used to provide the illuminated display with some desired color, without harm to the underlying light transmissive layer, despite wide variations in the thickness of the various layers. The applicant has determined that the combination of a clear separation layer 32 between one or more light absorptive layers 29 and the light transmissive layer 26, in conjunction with the use of a NdYAG laser beam for indicia etching, makes this accomplishment possible. It has been found that use of a NdYAG laser beam alone for indicia etching, without the incorporation of the clear separation layer 32, results in unsatisfactory discoloration or damage to the light transmissive layer 26 as the thickness of this layer is varied, for example, to enhance the light collection properties of the transmissive layer. Similarly, use of other types of laser radiation for etching have been found to unsatisfactorily harm the light transmissive layer 26 even when a clear separation layer 32 is employed.

One preferred embodiment of the illuminated display forming method of the present invention includes the steps of first applying a light transmissive layer 26, a clear layer 32 and a light absorptive layer 29 on a display substrate 20. Additional colored layers may also be applied over the light absorptive layer 29, if desired. Preferably, these layers are dried and fully cured before indicia etching is performed. The indicia are then etched using a NdYAG laser operating in a continuous mode with a power output of between approximately two and one half to seven and one half watts, and preferably at about five watts. Use of NdYAG power levels above approximately eight watts have been found to harm the light transmissive layer 26. In some instances, the light transmissive layer 26 has been found to separate from the display substrate 20 at power levels above eight watts. Optimally, the NdYAG laser beam travels over the region of the light absorptive layer 29 being etched at a rate of about five and one half to six and one half inches per second and preferably at about six inches per second. Slower travel rates at the optimum power levels discussed above have been found to damage or discolor the light transmissive layer 26 while higher travel rates may not satisfactorily remove all residue of the light absorptive layer 29, resulting in uneven illumination of the etched indicia. The output beam of the NdYAG laser is also preferably focused down from a beam of approximately one half inch in diameter to a beam of about five thousandths of an inch in diameter.

In an alternative embodiment of the illuminated display forming method of the present invention, the NdYAG laser may be operated in a pulsed mode to etched desired indicia patterns through the light absorptive layer 29. Optimally, when operating in pulsed mode the NdYAG laser repetitively generates a laser beam at a rate of about thirty kilohertz with a power output of approximately seven watts. When etching in a pulsed mode, laser travel rates of about five and one half to six and one half inches per second are again preferably employed, with an optimum rate of travel at six inches per second. It has also been found that operating the NdYAG laser in pulsed mode may leave some residue from the light absorptive layer 29 in the etched indicia. In such instances this residue may be removed by retracing the indicia pattern with the NdYAG laser operating in a continuous mode with a reduced power level, between approximately three and four watts. The combination of pulsed NdYAG laser operation in conjunction with subsequent retracing of the indicia pattern using the NdYAG laser in a lower power continuous mode has been found to produce better results for indicia etching.

The present invention, and the preferred embodiments discussed above, have been found to provide a novel method for forming a unique illuminated display that can be readily fabricated using NdYAG laser etching without imposing undesirably precise tolerances on the thicknesses of the various light transmissive and light absorptive layers forming the illuminated display. It will, of course, be understood that modifications to the above-described invention will be apparent to others skilled in the art. Accordingly, the scope of the present invention is not limited by the particular embodiments or the descriptions above, but is defined only by the claims set forth below and equivalents thereof.

What is claimed is:

1. A method of forming an illuminated display on a substrate, comprising the steps of:

applying on the substrate a transmissive layer that is generally light transmissive in the visible spectrum;

applying a clear layer on the light transmissive layer that is generally transparent in the visible spectrum;

applying an absorptive layer on the clear layer that is absorptive in the visible spectrum; and removing portions of the absorptive layer, with a beam of a NdYAG laser incident on the absorptive layer, without removal of the transmissive layer, wherein illuminative indicia are etched through the absorptive layer without damage by discoloration or said removal for the transmissive layer and dimensional tolerances of the transmissive and absorptive layers are relaxed relative to tolerances required in the absence of the clear layer.

2. The illuminated display forming method of claim 1, wherein the NdYAG laser has a pulsed output of about 7 watts.

3. The illuminated display forming method of claim 2, wherein the NdYAG laser is pulsed at a rate of about 30 kilohertz.

4. The illuminated display forming method of claim 3, wherein the NdYAG laser is operated at a travel rate of approximately 5.5 to 6.5 inches per second during the absorptive layer removal step.

5. The illuminated display forming method of claim 1 wherein the absorptive layer removal step includes a first sub-step of operating the NdYAG laser in a pulsed mode and a second sub-step of subsequently retracing the indicia with the NdYAG laser in a continuous mode.

6. The illuminated display forming method of claim 5 wherein the NdYAG laser has a pulsed output of about 7 watts at a pulse rate of about 30 kilohertz and a subsequent continuous output of approximately 3 to 4 watts per square inch during the second retracing sub-step.

7. The illuminated display forming method of claim 6 wherein the NdYAG laser is operated during the second sub-step at a travel rate of approximately 5.5 to 6.5 inches per second.

8. The illuminated display forming method of claim 1 wherein the absorptive layer removal step is performed while the NdYAG laser has a continuous mode output between 2.5 and 7.5 watts.

9. The illuminated display forming method of claim 8 wherein the NdYAG laser is operated at a travel rate of approximately 5.5 to 6.5 inches per second during the absorptive layer removal step.

10. The illuminated display forming method of claim 1 wherein the transmissive layer is a non-epoxy based white paint.

11. The illuminated display forming method of claim 1 wherein the transmissive, clear, and absorptive layers are paints and wherein said paints are cured before the absorptive paint removal step is performed.

12. The illuminated display forming method of claim 2 wherein the 7 watt beam from the NdYAG laser is focused from an initial beam area of approximately 0.196 sq inches to a beam area of approximately $1.9 \times 10^{-5}$ sq inches before intercepting the absorptive layer.

13. The illuminated display forming method of claim 1 wherein the clear layer is a flatted clear paint.

14. A method of forming an illuminated display on a substrate, comprising the steps of:

applying on the substrate a transmissive layer that is generally transmissive in the visible spectrum;

applying a clear paint layer on the light transmissive layer;

applying an absorptive layer on the clear layer that is generally absorptive in the visible spectrum; and removing portions of the absorptive layer, with a beam of a NdYAG laser incident on the absorptive layer, operating in a pulsed mode at approximately 30 kilohertz with a power output of approximately 7 watts without removal of the transmissive layer, wherein a pattern is formed in the absorptive layer and dimensional tolerances of the transmissive and absorptive layers are relaxed relative to tolerances required in the absence of the clear layer.

15. The illuminated display forming method of claim 14 wherein the NdYAG laser is operated at a travel rate of approximately 5.5 to 6.5 inches per second during the absorptive layer removal step.

16. The illuminated display forming method of claim 14 wherein the absorptive layer removal step includes an additional step of subsequently retracing the pattern with the NdYAG laser operating in a continuous mode with a power output of between 3 and 4 watts.

17. The illuminated display forming method of claim 16 wherein the NdYAG laser is operated at a travel rate of approximately 5.5 to 6.5 inches per second during the retracing step.

18. The illuminated display forming method of claim 14 wherein the transmissive layer is a non-epoxy based white paint.

19. The illuminated display forming method of claim 14 wherein the transmissive, clear and absorptive layers are paints and wherein said paints are cured before the absorptive layer removal step is performed.

20. The illuminated display forming method of claim 14 wherein the energy density of the NdYAG laser is focused to about $3.5 \times 10^5$ watts per square inch before intercepting the absorptive layer.

21. The illuminated display forming method of claim 20 wherein the NdYAG laser is operated at a travel rate of approximately 5.5 to 6.5 inches per second during the light absorptive layer removal step.

22. A method of forming an illuminated display on a substrate, comprising the steps of:

applying a visible light transmissive layer on the substrate;

applying a visibly clear layer on the light transmissive layer;

applying a visible light absorptive layer on the clear layer; and removing portions of the light absorptive layer, with a beam of a NdYAG laser incident on the absorptive layer, without removal of the transmissive layer, wherein illuminative indicia are etched through the light absorptive layer without damage by discoloration or said removal for the light transmissive layer and dimensional tolerances of the transmissive and absorptive layers are relaxed relative to tolerances required in the absence of the clear layer.

23. The illuminated display forming method of claim 22 wherein the light transmissive layer is a non-epoxy based white paint.

24. The illuminated display forming method of claim 22 wherein the light transmissive, clear and light absorptive layers are paints and wherein said paints are cured before the light absorptive layer removal step is performed.

25. The illuminated display forming method of claim 22 wherein the NdYAG laser is operated in a continuous mode with a power output between approximately 2.5 and 7.5 watts.

26. The illuminated display forming method of claim 22 wherein the visibly clear layer is a flatted clear paint.

27. The illuminated display forming method of claim 25 wherein the energy density of the NdYAG laser beam incident on the absorptive layer has an energy density of between $1.27 \times 10^5$ and $3.82 \times 10^5$ watts per square inch.

28. A method of forming an illuminated display on a substrate, comprising the steps of:

applying a layer of visible light transmissive paint on the substrate;

applying a layer of visibly clear paint on the transmissive layer;

applying a layer of visible light absorptive paint on the clear layer; and removing portions of the absorptive layer, with a beam of a NdYAG laser incident on the absorptive layer, without removal of the transmissive paint layer, wherein indicia are etched through the absorptive layer and dimensional tolerances of the transmissive and absorptive paint layers are relaxed relative to tolerances required in the absence of the clear layer.

* * * * *